United States Patent
Hiro

(10) Patent No.: US 11,250,070 B2
(45) Date of Patent: Feb. 15, 2022

(54) EPISODE MANAGEMENT DEVICE, EPISODE MANAGEMENT PROGRAM, AND EPISODE MANAGEMENT METHOD

(71) Applicants: KABUSHIKI KAISHA TOSHIBA, Minato-ku (JP); TOSHIBA DIGITAL SOLUTIONS CORPORATION, Kawasaki (JP)

(72) Inventor: Masanori Hiro, Gifu (JP)

(73) Assignees: KABUSHIKI KAISHA TOSHIBA, Minato-ku (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 111 days.

(21) Appl. No.: 16/621,141

(22) PCT Filed: Jan. 25, 2019

(86) PCT No.: PCT/JP2019/002531
§ 371 (c)(1),
(2) Date: Dec. 10, 2019

(87) PCT Pub. No.: WO2020/152862
PCT Pub. Date: Jul. 30, 2020

(65) Prior Publication Data
US 2021/0191982 A1    Jun. 24, 2021

(51) Int. Cl.
*G06F 17/00* (2019.01)
*G06F 16/907* (2019.01)
(Continued)

(52) U.S. Cl.
CPC .......... *G06F 16/907* (2019.01); *G06F 16/904* (2019.01); *G06F 16/906* (2019.01); *G06F 16/90344* (2019.01)

(58) Field of Classification Search
CPC ............ G06F 16/907; G06F 16/90344; G06F 16/906; G06F 16/904; G06F 16/954; G06F 16/957
See application file for complete search history.

(56) References Cited

U.S. PATENT DOCUMENTS

2010/0125803 A1* 5/2010 Johnson ................ G06F 16/954
                                                   715/760
2012/0023221 A1* 1/2012 Dayan ................. G06F 11/3006
                                                   709/224
(Continued)

FOREIGN PATENT DOCUMENTS

| JP | 2007-310622 A | 11/2007 |
| JP | 2008-52592 A | 3/2008 |
| JP | 2017-519285 A | 7/2017 |

OTHER PUBLICATIONS

Xiang Ao, Haoran Shi, Jin Wang, Luo Zuo, Hongwei Li, and Qing He. 2019. Large-Scale Frequent Episode Mining from Complex Event Sequences with Hierarchies. ACM Trans. Intell. Syst. Technol. 10, 4, Article 36, 26 pages. DOI:https://doi.org/10.1145/3326163, (Aug. 2019).*

(Continued)

*Primary Examiner* — Greta L Robinson
(74) *Attorney, Agent, or Firm* — Oblon, McClelland, Maier & Neustadt, L.L.P.

(57) ABSTRACT

An episode management device includes: an episode acquisition part that acquires an episode input, in form of text, by a registering user; an episode management part that manages the acquired episode; a registered tag extraction part that extracts a registered tag which is meta information of the episode based on the acquired episode; a registered tag management part that manages the extracted tag as tag information associated with the managed episode; a condition acquisition part that acquires, as condition information, (Continued)

a condition input by a searching user; a search tag extraction part that extracts a search tag from the condition information; a registered tag presentation part that user-selectably presents, to the searching user, the registered tag having high similarity to the search tag; and an episode presentation part that presents, to the searching user, the episode having high similarity to the registered tag selected by the searching user.

12 Claims, 16 Drawing Sheets

(51) Int. Cl.
*G06F 16/906* (2019.01)
*G06F 16/904* (2019.01)
*G06F 16/903* (2019.01)

(56) References Cited

U.S. PATENT DOCUMENTS

| | | |
|---|---|---|
| 2015/0331929 A1 | 11/2015 | El-Saban et al. |
| 2016/0078578 A1* | 3/2016 | Tumma ............... G16H 40/20 705/2 |
| 2016/0335260 A1* | 11/2016 | Convertino ......... G06F 16/2358 |
| 2018/0129390 A1* | 5/2018 | Wu .................... G06Q 10/0639 |
| 2020/0004618 A1* | 1/2020 | Thornhill ............. G06F 16/907 |

OTHER PUBLICATIONS

International Search Report dated May 7, 2019 in PCT/jP2019/002531 filed Jan. 25, 2019, (with English translation and English translation of Category of Cited Documents), 3 pages.

* cited by examiner

FIG.7

| Episode registration | |
|---|---|
| Facility | First factory ⌄ |
| Operation process | Upper surface polishing ⌄ |
| Production line | First line ⌄ |
| Time range | [ ] ~ [ ] |
| Subject | [ ] |
| Event | [ ] |
| Counter-measure | [ ] |
| | Registration |

FIG.8
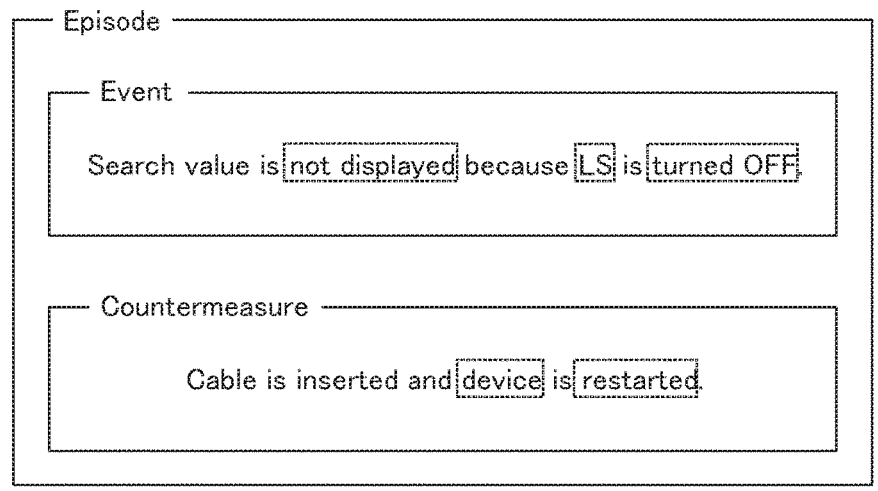
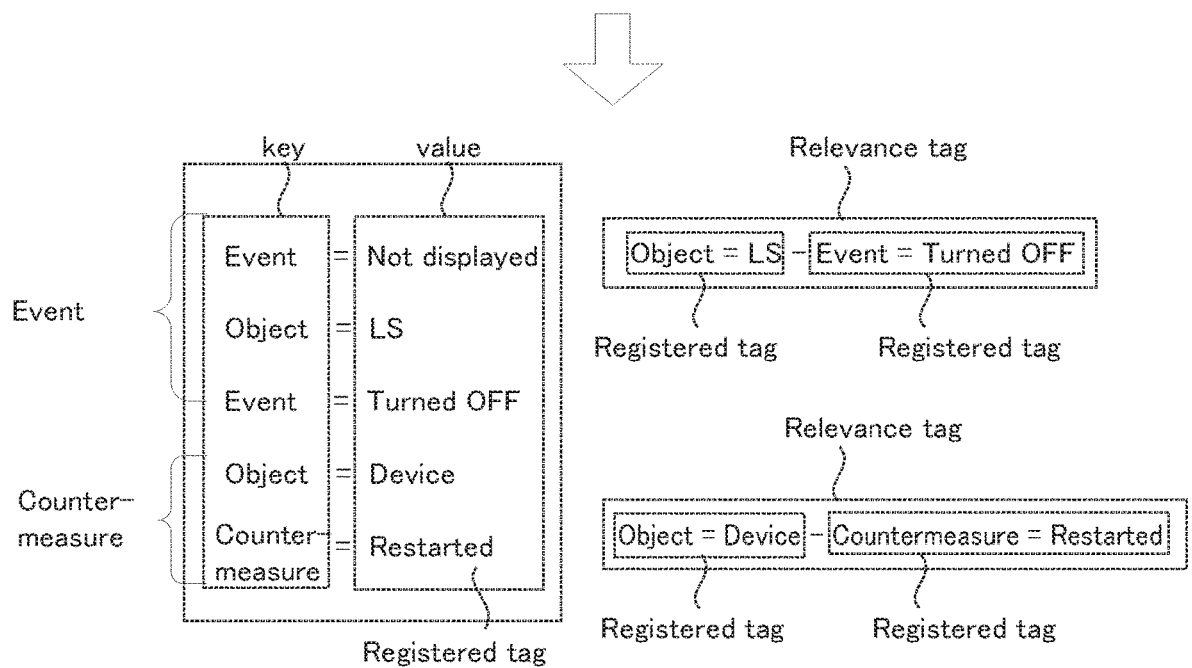

FIG.10

| Episode search | |
|---|---|
| Facility | First factory ⌄ |
| Operation process | Upper surface polishing ⌄ |
| Production line | First line ⌄ |
| Free word | [          ] |

Registered tag

Object
- Safety relay
- LS
- Guide
- ...

Event
- Contact is not broken
- loosening
- Electrode wear
- ...

Countermeasure
- Rotated
- Electrode replacement
- Air bleeding
- ...

[Relevance tag] [Search]

FIG.13

```
Episode search

Facility          [First factory          ⌄]
    Operation process [Upper surface polishing ⌄]

┌ Are the following events going on? ──────────┐
    │                                              │
    │  ☐ LS - Turned OFF                           │
    │  ☐ Outer electrical discharge machine        │
    │    - Interference stop occurring             │
    │                                              │
    │   [Select registered tag]   [Close]          │
    └──────────────────────────────────────────────┘

┌─ Registered tag ─────────────────────────────┐
    │  ┌─ Object ──────────────────────────────┐   │
    │  │  [Safety relay]  [LS]  [Guide]  …    │   │
    │  └───────────────────────────────────────┘   │
    │                                              │
    │  ┌─ Event ───────────────────────────────┐   │
    │  │  [Contact is not broken] [loosening]  │   │
    │  │  [Electrode wear]                     │   │
    │  │  …                                    │   │
    │  └───────────────────────────────────────┘   │
    │                                              │
    │  ┌─ Countermeasure ──────────────────────┐   │
    │  │  [Rotated] [Electrode replacement]    │   │
    │  │  [Air bleeding]  …                    │   │
    │  └───────────────────────────────────────┘   │
    │                                              │
    │        [Relevance tag]   [Search]            │
    └──────────────────────────────────────────────┘
```

FIG.15

| Case name | Event | Countermeasure | |
|---|---|---|---|
| ——— | ——— | ——— | Detail |
| ——— | ——— | ——— | Detail |
| ——— | ——— | ——— | Detail |
| ——— | ——— | ——— | Detail |
| ——— | ——— | ——— | Detail |
| ——— | ——— | ——— | Detail |
| ——— | ——— | ——— | Detail |
| ——— | ——— | ——— | Detail |
| ——— | ——— | ——— | Detail |

Episode presentation window

Next ten episodes

Network display

EPISODE MANAGEMENT DEVICE, EPISODE MANAGEMENT PROGRAM, AND EPISODE MANAGEMENT METHOD

TECHNICAL FIELD

The present invention relates to a technique for managing episodes.

BACKGROUND ART

Conventionally, there is known an episode management system for sharing knowledge within an organization such as a company or the like using a database in which situations where a problem arises in a business operation or measures against a problem are stored as episode information.

In the episode management system, episode information stored in the database can be searched for by a keyword, allowing a user to access episode information presented as a search result. According to such a search operation, when a keyword that user inputs matches at least some words included in target episode information or a keyword attached to the target episode information, the target episode information can be presented as a search result.

Specifically, there may be a case where the episode management system is used for passing on knowledge or know-how of experts to successors. Generally, in such a case, a user as an expert registers episodes in the database, and a user as a successor makes use of the episodes presented as a search result for problem solving.

Further, as a related technology, there is known a case management device for managing cases in product manufacturing. The case management device includes a storage part, a keyword management part that receives a parameter of a product relating to a case input by a user as a keyword item and resisters the parameter in the storage part, a first display part that reads out a keyword item from the storage part and displays the read keyword item, and a product information management part that receives a keyword corresponding to the keyword item input by the user and information necessary for the product manufacturing as product information and registering the keyword and product information in the storage part (Patent Document 1).

CITATION LIST

Patent Document

Patent Document 1: JP 2008-052592 A

DISCLOSURE OF THE INVENTION

Problems to be Solved by the Invention

However, in making use of episodes stored in the database, it is difficult for the successors who inherit know-how to find a keyword for searching the target episode. Thus, as compared to the experts having know-how, the successors cannot make use of the episode management system effectively.

The present invention has been made to solve the above problem, and an object thereof is to provide a technology capable of achieving effective use of stored episodes.

Means for Solving the Problems

To solve the above problem, according to an embodiment of the present invention, there is provided an episode management device that manages an episode in such a manner that the episode can be shared, including: an episode acquisition part that acquires an episode input, in the form of text, by a registering user who registers the episode; an episode management part that manages the acquired episode; a registered tag extraction part that extracts a registered tag which is meta information of the episode based on the acquired episode; a registered tag management part that manages the extracted tag as tag information associated with the managed episode; a condition acquisition part that acquires, as condition information, a condition input by a searching user who searches for the episode; a search tag extraction part that extracts a search tag from the condition information; a registered tag presentation part that user-selectably presents, to the searching user, the registered tag having high similarity to the search tag, out of the tag information managed by the registered tag management part; and an episode presentation part that presents, to the searching user, the episode having high similarity to the registered tag selected by the searching user, out of the episodes managed by the episode management part.

BRIEF DESCRIPTION OF THE DRAWINGS

FIG. 7 is a view illustrating an episode registration window.

FIG. 8 is a view illustrating extraction of a registered tag and a relevance tag.

FIG. 10 is a view illustrating an episode search window.

FIG. 13 is a view illustrating a presented relevant tag.

FIG. 15 is a view illustrating an episode presentation window.

BEST MODE FOR CARRYING OUT THE INVENTION

Hereinafter, an embodiment of the present invention will be described with reference to the accompanying drawings.
(Entire Configuration)

Figure 1:
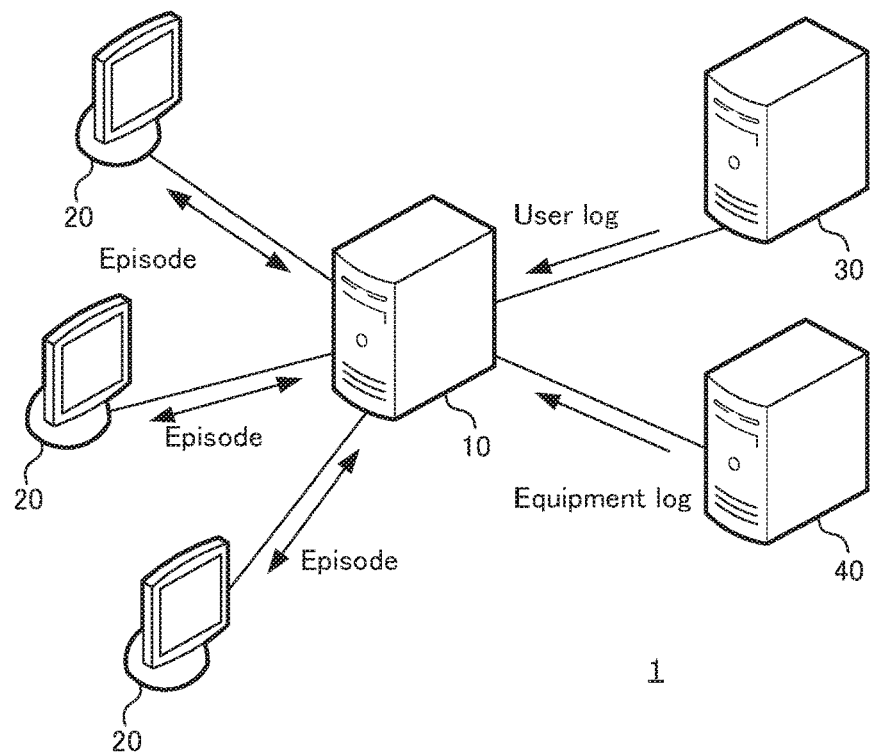
FIG. 1 is a schematic view illustrating the entire configuration of an episode management system according to an embodiment.
Figure 2:
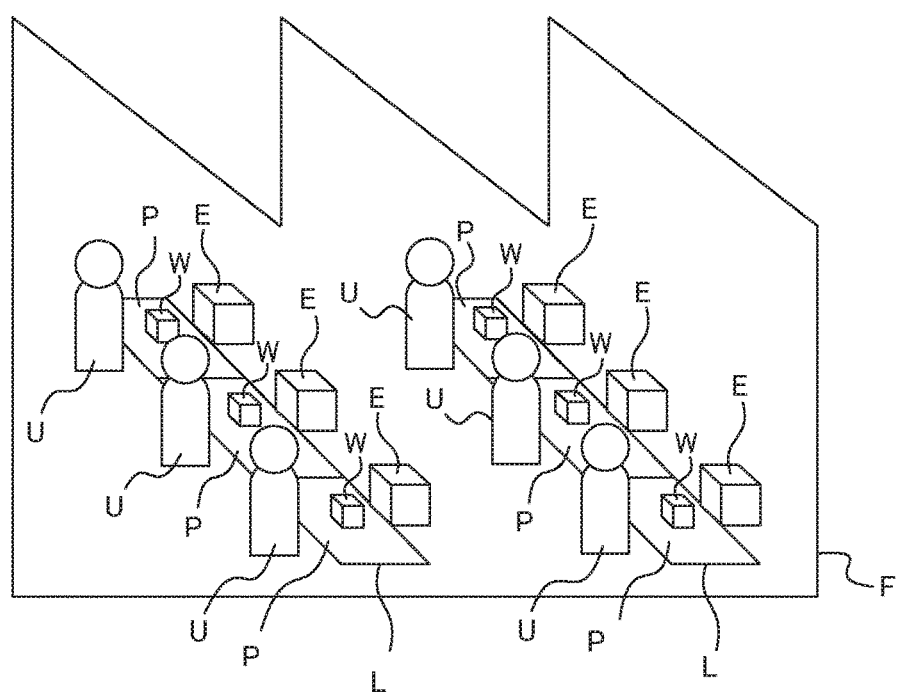
FIG. 2 is a schematic view illustrating a facility where the episode management system according to the embodiment is operated.

The entire configuration of the episode management system according to the present embodiment will be described. FIG. 1 is a schematic view illustrating the entire configuration of the episode management system according to the present embodiment, and FIG. 2 is a schematic view illustrating a facility where the episode management system is operated.

As illustrated in FIG. 1, an episode management system 1 according to the present embodiment includes an episode management device 10, at least one or more client devices 20, a user log management device 30, and an equipment log management device 40. The episode management device 10 stores episodes therein and manages them and is connected to the one or more client devices 20, user log management device 30 and equipment log management device 40 over a network. In the present embodiment, the episode management system 1 is operated so as to share episodes as knowledge or experiences relating to achievement of goals of a certain organization among a plurality of users belonging thereto.

In the present embodiment, the episode management system 1 is operated in a company having a plurality of facilities as a production means, and the facilities are each a factory F. The factory F has therein a plurality of production lines L, as illustrated in FIG. 2. Each production line L has a plurality of operation processes P, and each operation process P is provided with an equipment E for applying machining to a work W. Further, each operation processes P is assigned with a user U who utilizes the episode management system 1 as a worker engaged in production operation.

The client device 20 is a terminal device that the user U operates when utilizing the episode management system 1. The user U registers an episode to be shared in the company in the episode management device 10 through the client device 20 and acquires an episode from the episode management device 10 through the client device 20.

Each user U performing operation wears an HID (Human Interface Device). The HID serves as a measurement device for measuring the behavior of the user U. Specific examples of the HID include a sensor for measuring the motion of the user U involved in an operation using the equipment E and the position of the user in the factory F, and a microphone for recording voice of the user U. For example, the HID is provided as a wrist-band type device that can be worn on the wrist of the user. The measurement data and voice data as a user log of each user U measured by the above HID are transmitted to the user log management device 30 over a network. The user log management device 30 associates a device ID uniquely indicating the HID and the received user log with each other and manages the user log in chronological order by adding a time stamp thereto. Further, the user log management device 30 transmits the user log to the episode management device 10 in response to a request from the episode management device 10.

Each equipment E provided in the factory F is provided with an equipment sensor. The equipment sensor is a sensor for measuring a change caused due to operation conditions of the equipment E, such as the temperature or vibration thereof. Further, each equipment E outputs, when an error occurs, an error code which is an identifier indicating the type of error. The sensor value measured using the above equipment sensor or error code of the equipment E is transmitted as an equipment log, to the equipment log management device 40 over a network. The equipment log management device 40 associates the received equipment log with individual equipment E and manages the equipment log in chronological order by adding a time stamp thereto. Further, the equipment log management device 40 transmits the equipment log to the episode management device 10 in response to a request from the episode management device 10.

(Hardware Configuration)

Figure 3:
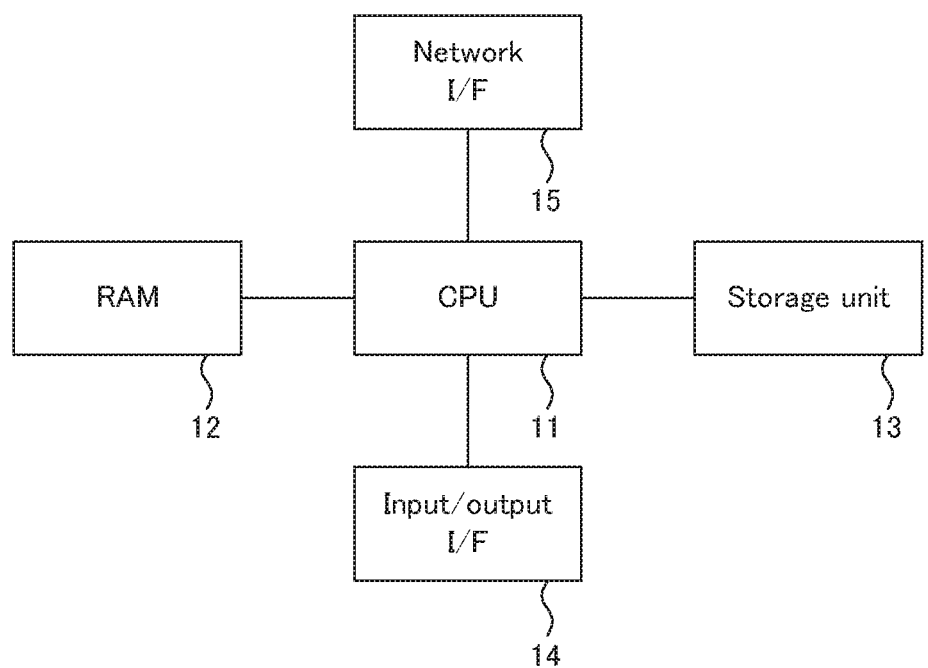
FIG. 3 is a block diagram illustrating the hardware configuration of an episode management device.

The hardware configurations of the devices constituting the episode management system will be described. FIG. 3 is a block diagram illustrating the hardware configuration of the episode management device.

As illustrated in FIG. 3, the episode management device 10 includes, as hardware, a CPU (Central Processing Unit) 11, a RAM (Random Access Memory) 12, a storage unit 13, an input/output I/F (Interface) 14, and a network I/F 15. The CPU 11 and RAM 12 work together to execute various functions. The storage unit 13 stores therein various data items used for processing (episode management program) executed by the various functions. The input/output I/F 14 performs input/output of data with an input unit (keyboard, etc.) and an output unit (display, etc.) connected to the episode management device 10. The network I/F 15 performs wired or wireless communication with other devices such as the client device 20, user log management device 30, and equipment log management device 40. In the present embodiment, the hardware configurations of the client device 20, user log management device 30 and equipment log management device 40 are substantially the same as that of the episode management device 10, so descriptions thereof will be omitted.

(Functional Configuration of Episode Management Device)

Figure 4:
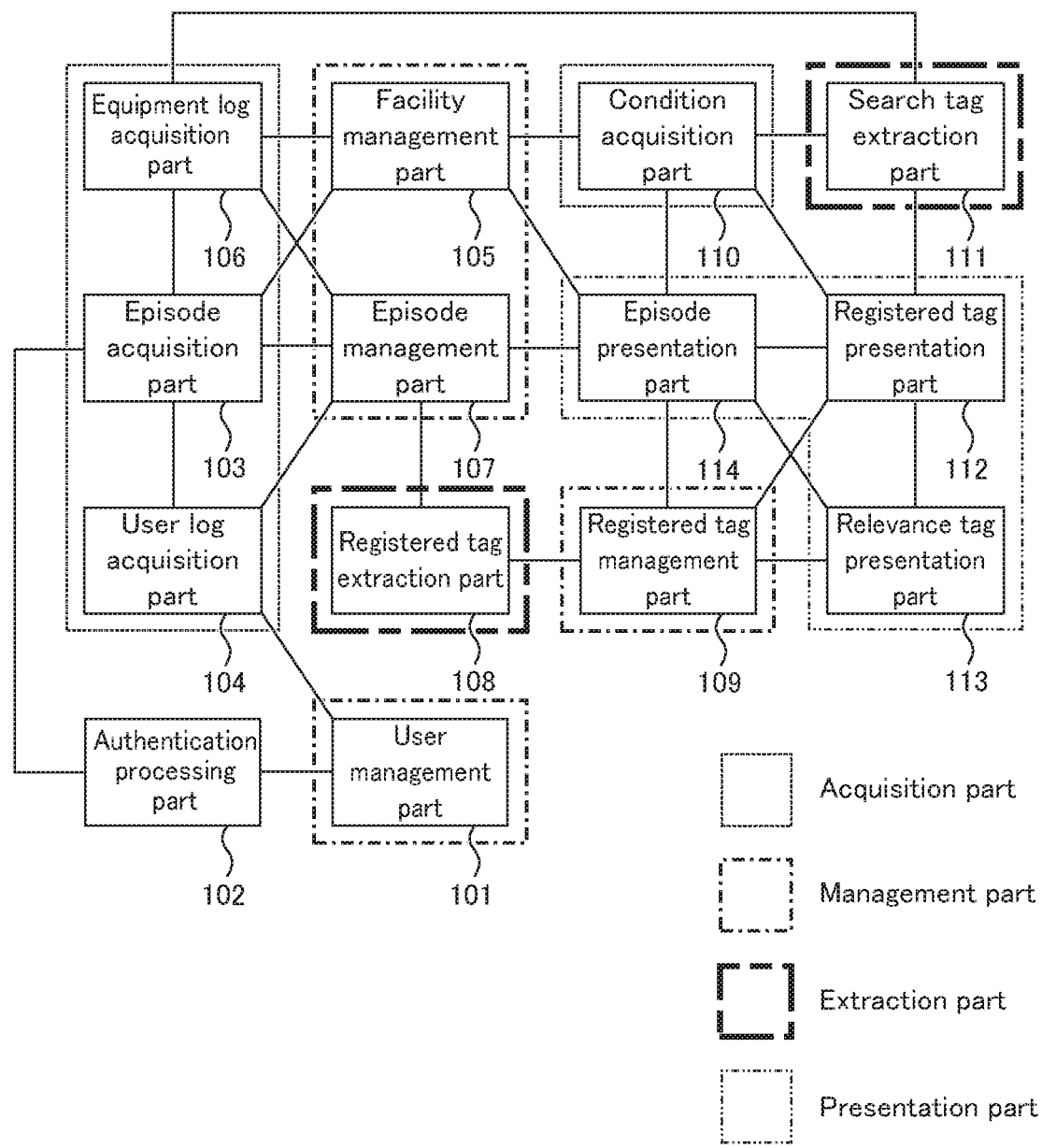
FIG. 4 is a block diagram illustrating the functional configuration of the episode management device.

The functional configuration of the episode management device will be described. FIG. 4 is a block diagram illustrating the functional configuration of the episode management device.

As illustrated in FIG. 4, the episode management device 10 includes as the functions thereof, a user management part 101, an authentication processing part 102, an episode acquisition part 103, a user log acquisition part 104, a facility management part 105, an equipment log acquisition part 106, an episode management part 107, a registered tag extraction part 108, a registered tag management part 109, a condition acquisition part 110, a search tag extraction part 111, a registered tag presentation part 112, a relevance tag presentation part 113, and an episode presentation part 114.

The user management part 101 manages, as user information, a user ID which is an identifier uniquely indicating a user, a password as authentication information, and the device ID of the HID that the user wears in association with one another. Further, in the user information, a facility ID, a production line ID, and an operation process ID, which are to be described later are associated with the user ID as an affiliation destination of the user.

The authentication processing part 102 performs user authentication using the user ID and its corresponding password. The episode acquisition part 103 acquires an episode input in the form of text by a user authenticated by the authentication processing part 102. The user log acquisition part 104 acquires, from the user log management device 30, the user log associated with the device ID corresponding to the user ID.

The facility management part 105 manages, as facility information, a facility ID uniquely indicating each of a plurality of facilities that the company where the episode management system 1 is operated has, a production line ID uniquely indicating a production line belonging to each individual facility, an operation process ID uniquely indicating an operation process belonging to each individual production line, and an equipment ID uniquely indicating an equipment provided in each individual operation process by associating them so as to make clear the affiliation relationship between them. The facility ID, production line ID, operation process ID and equipment ID are registered in advance by an administrator of: the episode management system 1 prior to the operation of the episode management system 1.

The equipment log acquisition part 106 acquires an equipment log associated with the equipment ID from the equipment log management device 40. As described later, the equipment ID used for the acquisition of the equipment log is an equipment ID associated, in the facility information, with the production ID acquired together with the episode.

The episode management part 107 manages content information including the user ID authenticated by the authentication processing part 102, episode acquired by the episode acquisition part 103, user log acquired by the user log acquisition part 104, equipment log acquired by the equipment log acquisition part 106 in association with a content ID which is an identifier uniquely indicating the content information.

The registered tag extraction part 108 extracts, from the episode included in the content information, meta information concerning the content information as a registered tag. The registered tag extraction part 108 extracts the registered tag through text mining for the episode and acquisition of an error code included in the equipment log. As described later, for the episode, a relevance tag represented as a set of two extracted tags is further extracted.

The registered tag management part 109 manages tag information including the registered and relevance tags extracted by the registered tag extraction part 108 and content ID indicating the content information from which this tag information is extracted in association with each other.

The condition acquisition part 110 acquires a condition input by the user for acquiring desired content information managed by the episode management part 107. As the condition, the facility ID, operation process ID, production line ID, text, tag or the like is input or selected by the user as described later in greater detail.

The search tag extraction part 111 extracts a search tag based on the condition acquired by the condition acquisition part 110. The search tag is the error code included in the equipment log associated with the equipment ID relating to the facility ID, operation process ID or production line ID which is acquired as the condition or a word extracted through text mining for the text input as the condition.

The registered tag presentation part 112 performs score calculation for the tag information managed by the registered tag management part 109 based on the search tag extracted by the search tag extraction part 111 and presents, to the user, the registered tags in the descending order of the calculated score in a user-selectable manner.

The relevance tag presentation part 113 performs score calculation for the tag information managed by the registered tag management part 109 based on the registered tag selected by the user from among the registered tags presented by the registered tag presentation part 112 and presents, to user, the relevance tag included in the tag information whose score is equal to or higher than a predetermined value.

The episode presentation part 114 performs score calculation for the tag information managed by the registered tag management part 109 based on all the registered tags selected by the user and presents, to the user, the content information managed by the episode management part 107 in the descending order of the score calculated for the corresponding tag information.

(Entire Operation of Episode Management Device)

Figure 5:
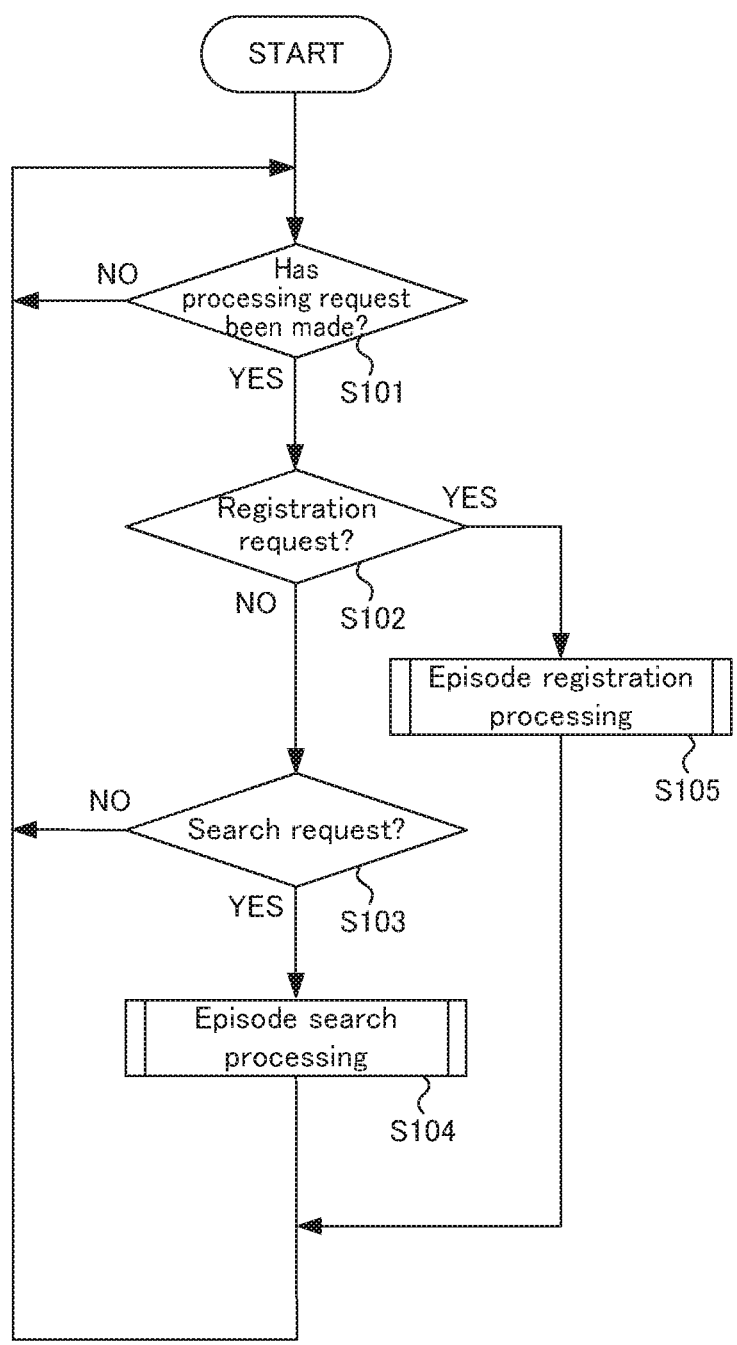
FIG. 5 is a flowchart illustrating the entire operation of the episode management device.

The entire operation of the episode management device will be described, FIG. 5 is a flowchart illustrating the entire operation of the episode management device. In FIG. 5, it is assumed that a predetermined user has been authenticated.

As illustrated in FIG. 5, the episode management device 10 determines whether or not a processing request has been made from the user through the client device 20 (S101).

When it is determined that the processing request has been made (YES in S101), the episode management device 10 determines whether or not the processing request from the user is a registration request (S102).

When it is determined that the processing request is not the registration request (NO in S102), the episode management device 10 determines whether or not the processing request from the user is a search request (S103).

When it is determined that the processing request is the search request (YES in S103), the episode management device 10 executes episode search processing to be described later (S104) and then determines once again whether or not a processing request has been made from the user (S101).

On the other hand, when it is determined that the processing request is not the search request (NO in S103), the episode management device 10 determines once again whether or not a processing request has been made from the user (S101).

When it is determined, in step S102, that the processing request is the registration request (YES in S102), the episode management device 10 executes episode registration processing to be described later (S105) and then determines once again whether or not a processing request has been made (S101).

Further, when it is determined, in step S101, that no processing request has been made (NO in S101), the episode management device 10 determines once again whether or not a processing request has been made (S101).

(Episode Registration Processing)

Figure 6:
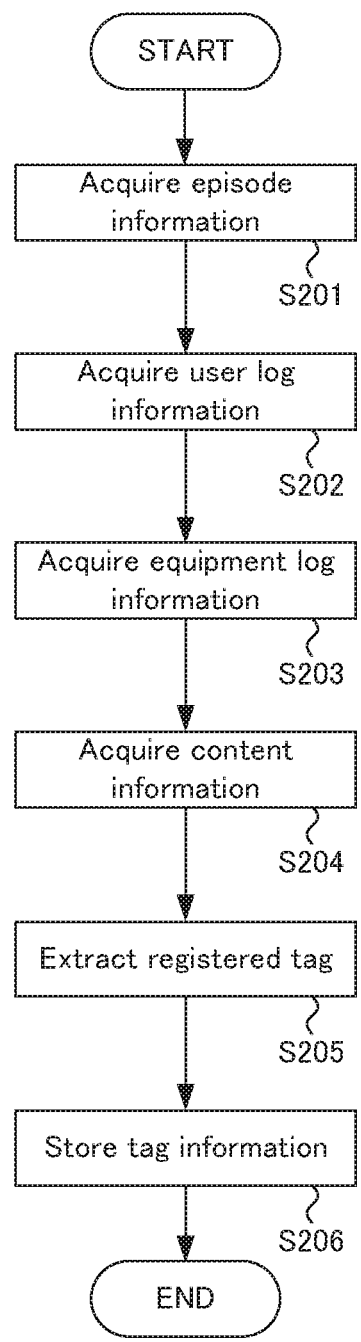
FIG. 6 is a flowchart illustrating the operation of episode registration processing.

The episode registration processing will be described. FIG. 6 is a flowchart illustrating the operation of the episode registration processing. FIG. 7 is a view illustrating an episode registration window. FIG. 8 is a view illustrating extraction of the registered tag and relevance tag.

As illustrated in FIG. 6, the episode acquisition part 103 acquires episode information input by the user through the client device 20 (S201). The episode information is acquired when the user performs selection or text input with respect to items on an episode registration window as illustrated in FIG. 7. The episode information includes a user ID of the user who has made the input and input items such as "facility", "operation process", "production line", "time range", "subject", "event" and "countermeasure".

The items "facility" "operation process" and "production line" are presented, as information indicating a site where an episode to be registered occurs, such that the facility ID, operation process ID and production line ID managed by the facility management part 105 can be selected by the user. Options corresponding to the items "facility", "operation process" and "production line" are each presented as the name of the object to be indicated by an identifier, like, e.g., "first factory", "upper surface polishing", and "first line". As a default setting, the facility ID, operation process ID and production line ID associated with the user ID in the user information are selected in advance for the items "facility", "operation process" and "production line", respectively.

The item "time range" has two text input fields as information for indicating a time range within which an episode to be registered occurs. One text input field is input with day/time at which the episode occurred, and the other text input field is input with day/time at which the episode ended.

The items "subject", "event" and "countermeasure" each have one text input field. The "subject" is input with the name of an episode for other users to easily grasp the outline of the episode. The "event" and "countermeasure" are each input with text indicating the episode. More specifically, the "event" is assumed to be input with text indicating an event to be handled, and the "countermeasure" is assumed to be input with text indicating appropriate countermeasure against the event input to the "event".

After the episode information is acquired by the episode acquisition part 103, the user log acquisition part 104 acquires user log information from the user log management device 30 based on the user ID and time range included in the episode information (S202). Specifically, the user log acquisition part 104 refers to the user information managed by the user management part 101 to acquire the device ID associated with the user ID and acquires as user log information the user log falling within the time range included in the episode information from the user log associated with the device ID.

The equipment log acquisition part 106 acquires equipment log information from the equipment log management device 40 based on the facility ID, production line ID and operation process ID which are included in the episode information (S203). Specifically, the equipment log acquisition part 106 acquires, from the facility information managed by the facility management part 105, the equipment ID associated with a combination of the facility ID, production line ID and operation process ID which are included in the episode information and acquires, as the equipment log information, an equipment log falling within the time range included in the episode information from the equipment log associated with the equipment ID in the equipment log management device 40.

Then, the episode management part 107 associates the episode information acquired by the episode acquisition part 103, user log information acquired by the user log acquisition part 104 and equipment log information acquired by the equipment log acquisition part 106 with one another into the content information, and manages the content information by adding thereto the content ID which is an identifier uniquely indicating the content information (S204).

Then, the registered tag extraction part 108 extracts the registered tag based on the content information (S205). Specifically, the registered tag extraction part 108 extracts the registered tag from the episode information and equipment log information constituting the content information. From the episode information, the registered tag is extracted as follows. The name of the object indicated by each of the facility ID, production line ID and operation process ID is extracted as the registered tag. Further, parts of the text input as the "event" and "countermeasure" are extracted as the registered tags, and the relevance tag indicating the relevance between the two registered tags is extracted. On the other hand, from the equipment log information, when an error code is included in the equipment log information, the error code is extracted as the registered tag.

The registered tag is extracted as a set of Key and Value. A value extracted as the registered tag is substituted for the Value, and a category to which the Value belongs is substituted for the Key. The categories of the Key in the case other than the registered tag extracted from the text include "facility", "production line", "operation process", "error code" and the like, and the set of Key and Value is represented in the form of "Key=Value", like, e.g., "facility=first factory", "operation process=upper surface polishing", "production line=first line", and "error code=ERR001".

Here, extraction of the registered tag from the text will be described. As illustrated in FIG. 8, the registered tag is extracted through text mining for the sentence input as each of the "event" and "countermeasure", and "event", "countermeasure", and "object" are set as the Key. Prior to the text mining processing, machine learning is performed such that a clause representing a passive event is extracted as the value of the "event", that a clause representing an active event is extracted as the value of the "countermeasure", and that a subject or an object of the event described as the "event" or "countermeasure" is extracted as the value of the "object". The text mining processing by the registered tag extraction part 108 extracts the registered tag based on a prediction model obtained by such machine learning. Further, the registered tag extraction part 108 extracts, as the relevance tag, a set of the registered tag extracted as the "object" and registered tag extracted as the "event" or "countermeasure" having the registered tag extracted as the "object" as the subject or object thereof.

After extraction of the registered tag and relevance tag, the registered tag management part 109 manages the tag information including the registered tag and relevance tag by adding thereto the content ID added to the content information which is the extraction source of the registered tag and relevance tag (S206), and the episode registration processing is ended.

(Episode Search Processing)

Figure 9:
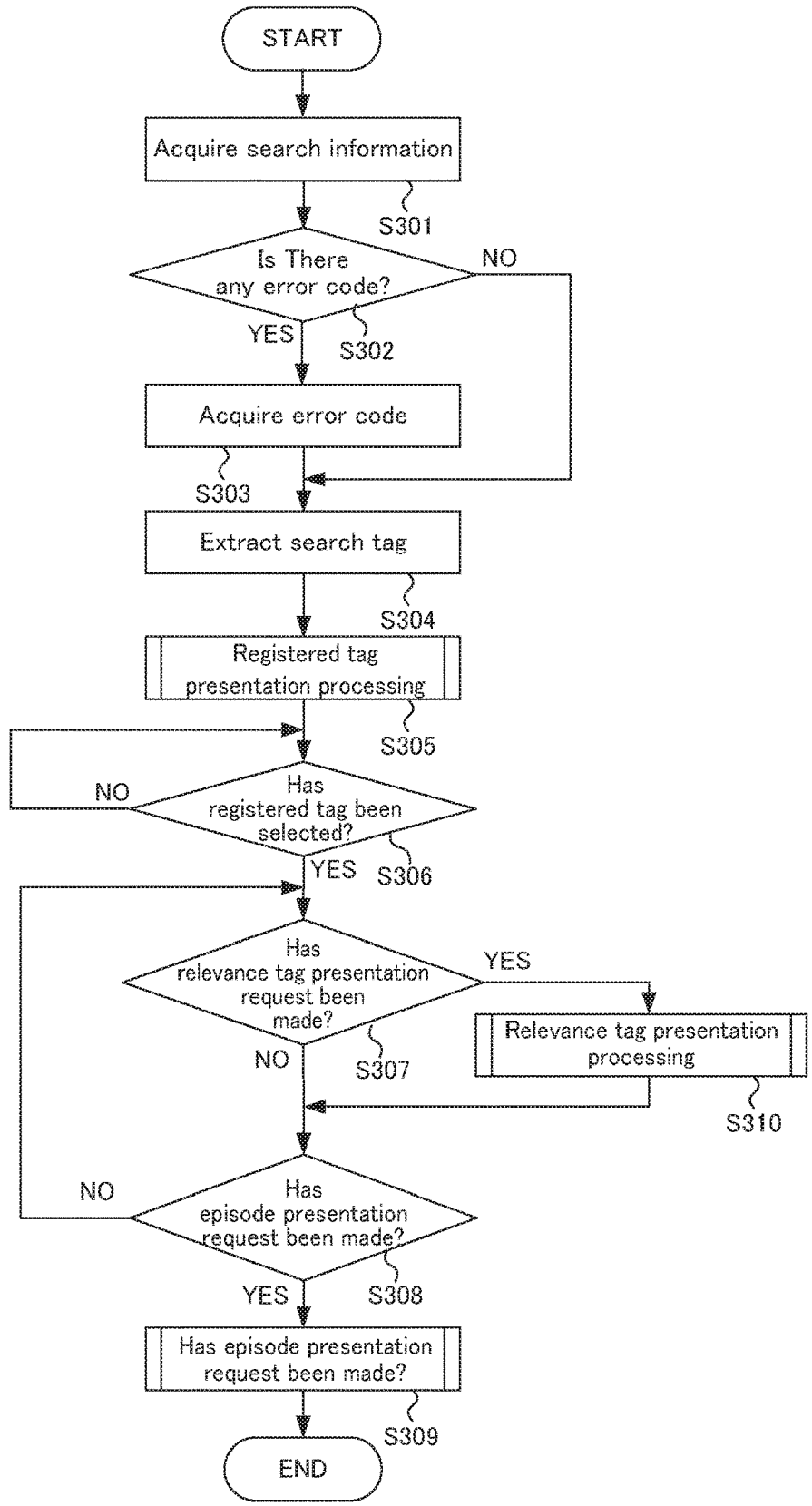
FIG. 9 is a flowchart illustrating the operation of episode search processing.

The episode search processing will be described. FIG. 9 is a flowchart illustrating the operation of the episode search processing. FIG. 10 is a view illustrating an episode search window.

As illustrated in FIG. 9, the condition acquisition part 110 acquires search information input by the user through the client device 20 (S301). The search information is acquired when the user performs selection or text input with respect to items on an episode search window as illustrated in FIG. 10. The search information includes the user ID of the user who has made the input and input items such as the "facility", "operation process", "production line" and "free word."

Like the items shown in the above-described episode registration window, the items "facility", "operation process" and "production line" are presented, as information indicating a site where an episode to be presented, i.e., required as a search result, occurred, such that the facility ID, operation process ID, and production line ID managed by the facility management part 105 can be selected by the user. Further, as in the episode registration processing, the facility ID, operation process ID and production line ID associated with the user ID in the user information are selected in advance, as a default setting, for the items "facility", "operation process" and "production line", respectively.

The item "free word" has one text input field. Like the item "event" on the episode registration window, this text input field is assumed to be input with text indicating an event to be handled in order for the user to check what countermeasure has been taken by another user from a similar episode occurred in the past.

After acquisition of the search information, the condition acquisition part 110 determines, based on the facility ID, production line ID and operation process ID which are included in the search information and a current time, whether or not any error code is included in the equipment log information managed by the equipment log management device 40 (S302). More specifically, the condition acquisition part 110 acquires, from the facility information managed by the facility management part 105, the equipment ID associated with a combination of the facility ID, production line ID and operation process ID which are included in the search information and determines whether or not there exists any error code falling within a time range from a time point preceding the current time by a prescribed time period to the current time in the error codes included in the equipment log associated with the equipment ID in the equipment log management device 40.

When it is determined that any error code satisfying the above condition exists (YES in S302), the condition acquisition part 110 acquires the error code and includes it in the search information (S303).

Then, the search tag extraction part 111 extracts the search tag based on the search information (S304). Specifically, from the search information, the name of the object indicated by each of the facility ID, production line ID, and operation process ID is extracted as the search tag. In addition, a part of text input as the "free word" is also extracted as the search tag. When the error code acquired by the condition acquisition part 110 is included in the search information, this error code is extracted as the search tag. Like the registered tag, the search tag is extracted as a set of Key and Value. Further, as in extraction of the registered tag, extraction of the search tag from the text input as the "free word" is performed by the text mining based on a prediction model, and "event" and "object" are set as the Key.

After extraction of the search tag, the registered tag presentation part 112 executes registered tag presentation processing of presenting, to the user, the registered tag on the episode search window as illustrated in FIG. 10 (S305). Details of the registered tag presentation processing will be described later.

Then, the relevance tag presentation part 113 determines whether or not at least one of the registered tags presented to the user by the registered tag presentation processing has been selected by the user (S306).

When it is determined that the registered tag has been selected by the user (YES in S306), the relevance tag presentation part 113 determines whether or not a relevance tag presentation request has been made by the user (S307). The relevance tag presentation request is made by pressing a "relevance tag" button on the episode search window of FIG. 10.

When it is determined that the relevance tag presentation request has not been made (NO in S307), the episode presentation part 114 determines whether or not an episode presentation request has been made by the user (S308). The episode presentation request is made by pressing a "search" button on the episode registration window of FIG. 10.

When it is determined that the episode presentation request has been made (YES in S308), the episode presentation part 114 executes episode presentation processing of presenting, to the user, the episode based on the selected registered tag (S309), and the episode search processing is ended. Details of the episode presentation processing will be described later.

On the other hand, when it is determined that the episode presentation request has not been made (NO in S308), the relevance tag presentation part 113 determines once again whether or not the relevance tag presentation request has been made (S307).

When it is determined in step S307 that the relevance tag presentation request has been made (YES in S307), the relevance tag presentation part 113 executes relevance tag presentation processing of presenting the relevance tag, to the user, based on the selected registered tag (S310), and the episode presentation part 114 determines whether or not the episode presentation request has been made by the user (S308). Details of the relevance tag presentation processing will be described later.

When it is determined in step S306 that no registered tag has been selected by the user (NO in S306), the relevance tag presentation part 113 determines once again whether or not at least one of the registered tags presented to the user by the registered tag presentation processing has been selected by the user (S306).

When it is determined in step S302 that the error code satisfying the above condition does not exist (NO in S302), the search tag extraction part 111 extracts the search tag based on the search information (S304).

(Registered Tag Presentation Processing)

Figure 11:
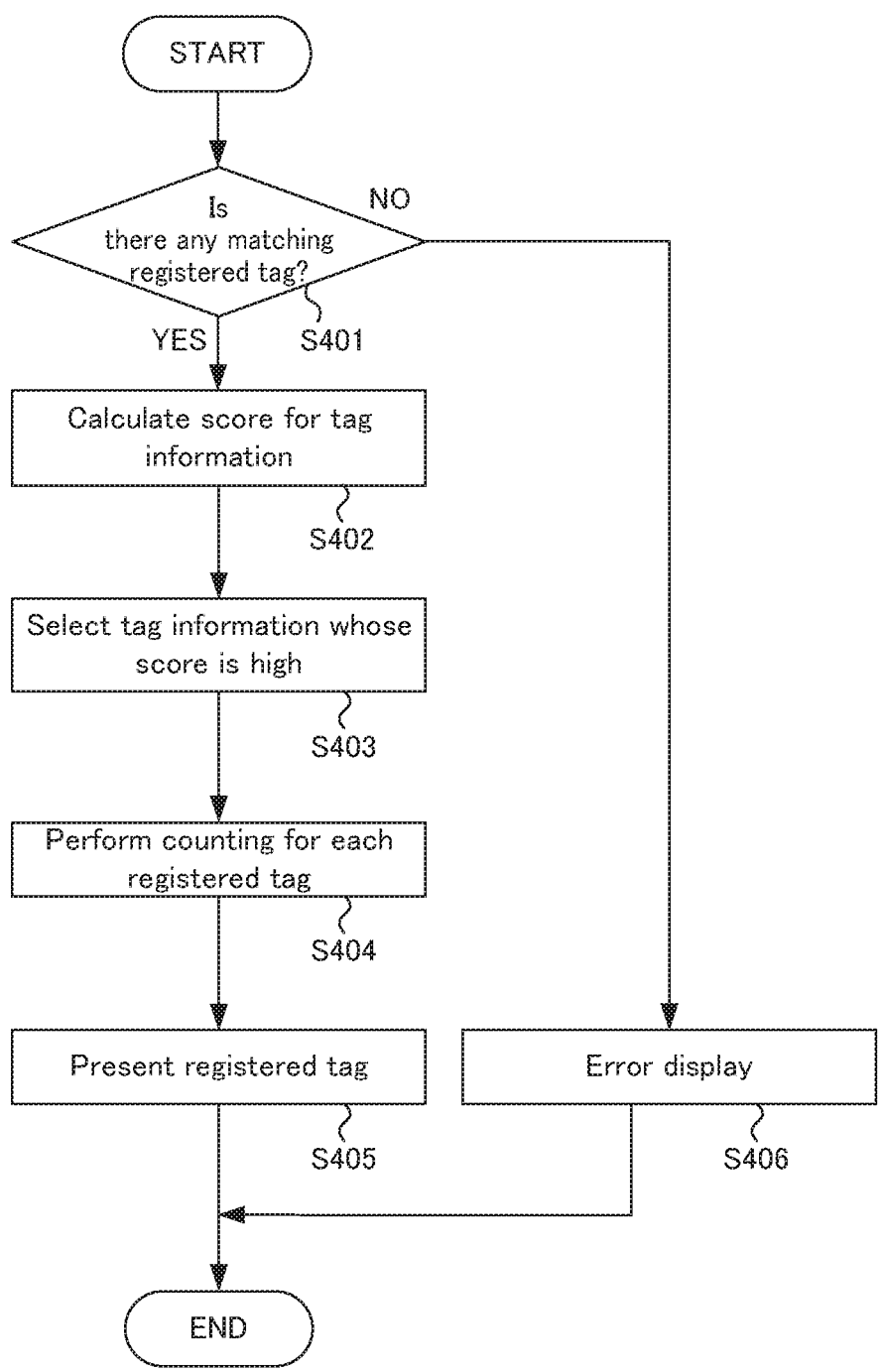
FIG. 11 is a flowchart illustrating the operation of registered tag presentation processing.

The registered tag presentation processing will be described. FIG. 11 is a flowchart illustrating the operation of the registered tag presentation processing.

As illustrated in FIG. 11, the registered tag presentation part 112 determines, out of the registered tags included in all the tag information managed by the registered tag management part 109, whether or not there is any registered tag matching any of the search tags extracted by the search tag extraction part 111 (S401).

When it is determined that there is any registered tag matching the search tag (YES in S401), the registered tag presentation part 112 calculates a score for each of all the tag information managed by the registered tag management part 109 (S402). The score calculated here indicates a degree matching with the search tag by a numerical value and is calculated such that the tag information including a larger number of registered tags matching the search tag shows a larger numerical value.

After the score calculation, the registered tag presentation part 112 selects tag information whose calculated score is equal to or higher than a predetermined value (S403). Specifically, the registered tag presentation part 112 may select tag information whose calculated score is relatively high. Specifically, for example, the tag information is sorted in the descending order in terms of the calculated score, and a predetermined number of pieces of top-ranked tag information are selected.

Then, for all the registered tags included in all the selected pieces of tag information, the registered tag presentation part 112 counts the overlap number of registered tags while removing redundant ones (S404). After that, as illustrated in FIG. 10, the registered tag presentation part 112 sorts the registered tags in the descending order in terms of the overlap number and presents the sorted result in a user-selectable manner (S405) In FIG. 10, the registered tags are presented by category, i.e., by the value set in the Key.

When it is determined in step S401 that there is no registered tag matching the search tag (NO in step S401), the registered tag presentation part 112 presents, as error display, information indicating that there is no registered tag matching the search tag to the user (S406) and ends the registered tag presentation processing.

As described above, by presenting the registered tag matching the search tag extracted from the condition input by the user, it is possible for the user to select the registered tag suitable for searching for the episode.

(Relevant Tag Presentation Processing)

Figure 12:
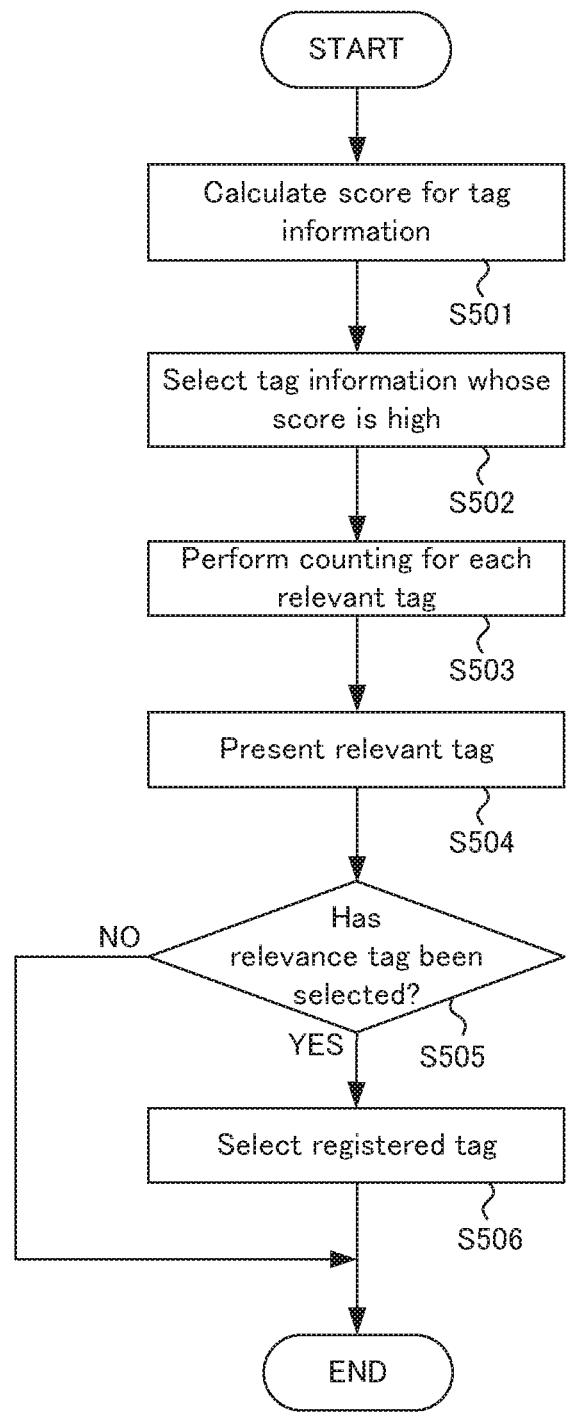
FIG. 12 is a flowchart illustrating the operation of relevant tag presentation processing.

The relevant tag presentation processing will be described. FIG. 12 is a flowchart illustrating the operation of the relevant tag presentation processing. FIG. 13 is a view illustrating the presented relevant tag.

As illustrated in FIG. 12, the relevance tag presentation part 113 calculates a score for each of all the pieces of tag information managed by the registered tag management part 109 (S501). The score calculated here indicates a degree matching with the selected registered tag by a numerical value and is calculated such that the tag information including a larger number of registered tags matching the selected registered tag has a larger numerical value.

After the score calculation, the relevance tag presentation part 113 selects the tag information whose calculated score is equal to or higher than a predetermined value (S502). Specifically, the relevance tag presentation part 113 may select the tag information whose calculated score is relatively high. Specifically, for example, the tag information is sorted in the descending order in terms of the calculated score, and a predetermined number of pieces of top-ranked tag information are selected.

Then, for all the relevant tags included in all the selected tag information, the relevance tag presentation part 113 counts the number of overlaps of relevant tags while removing redundant ones (S503). After that, as illustrated in FIG. 13, the relevance tag presentation part 113 presents, to the user, the relevance tag the number of overlaps thereof is equal to or larger than a predetermined value, in a user-selectable manner (S504). In FIG. 13, two relevance tags are presented so as to be selectable by a checkbox allowing switching between True or False.

Then, the relevance tag presentation part 113 determines whether or not the presented relevance tag has been selected by the user (S505). In the present embodiment, the relevance tag presentation part 113 determines that the relevance tag has been selected, when any checkbox added to the relevance tag presented to the user is checked (True), and a "select registered tag" button is pressed.

When it is determined that the presented relevance tag has been selected by the user (YES in S505), the relevance tag presentation part 113 selects the registered tag included in the selected relevance tag (S506) and ends the relevance tag presentation processing.

On the other hand, when it is determined that the presented relevance tag has not been selected by the user (NO in S505), the relevance tag presentation part 113 ends the relevance tag presentation processing.

As described above, by presenting, out of the relevance tags included in the tag information including a relatively large number of the registered tags matching the registered tag selected by the user, the relevance tag having a relatively high overlap degree in a user-selectable manner, it is possible to provide the user with a combination of selections of registered tags suitable for searching for an episode.

(Episode Presentation Processing)

Figure 14:
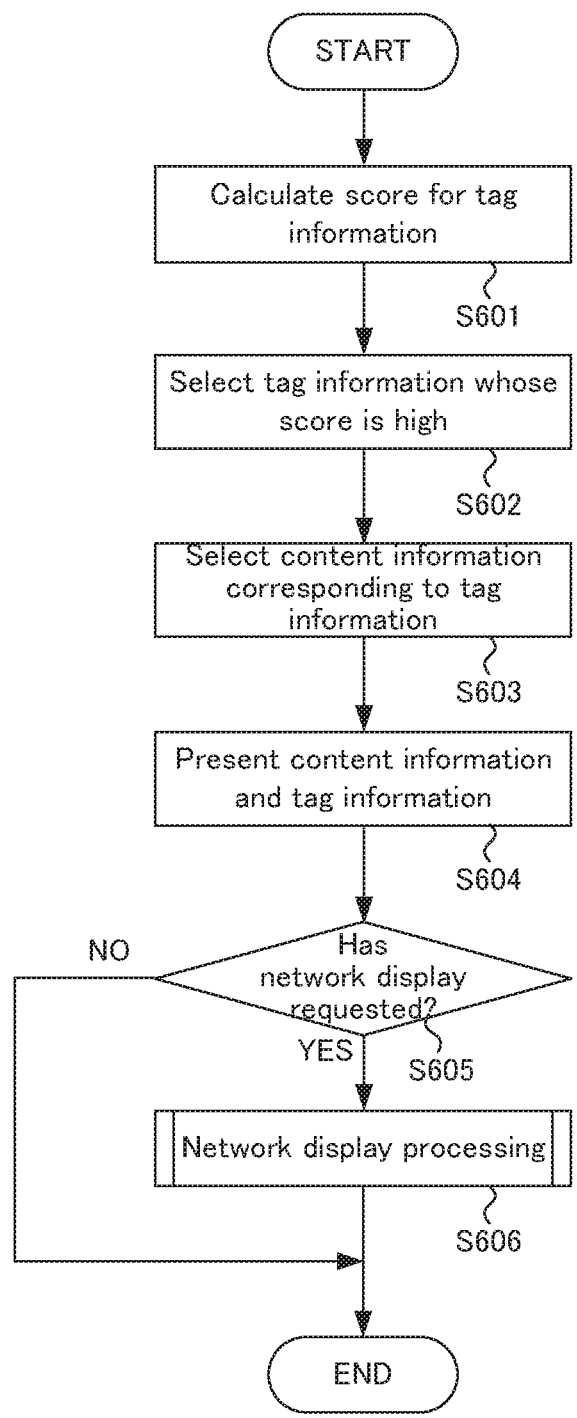
FIG. 14 is a flowchart illustrating the operation of episode presentation processing.

The episode presentation processing will be described. FIG. 14 is a flowchart illustrating the operation of the episode presentation processing. FIG. 15 is a view illustrating an episode presentation window.

As illustrated in FIG. 14, the episode presentation part 114 calculates a score for each of all pieces of the tag information managed by the registered tag management part 109 (S601). The score calculated here indicates the matching degree with the selected registered tag by a numerical value and is calculated such that the tag information including a larger number of registered tags matching the selected registered tag has a larger numerical value.

After the score calculation, the episode presentation part 114 selects the tag information whose calculated score is equal to or higher than a predetermined value (S602). Specifically, the episode presentation part 114 may select the tag information whose calculated score is relatively high. Specifically, for example, the tag information is sorted in the descending order in terms of the calculated score, and a predetermined number of pieces of top-ranked tag information are selected.

Then, the episode presentation part 114 selects, from among the content information managed by the episode management part 107, the content information corresponding to the selected tag information, i.e., the content information added with the same content ID as that of the selected tag information (S603).

After selection of the content information, the episode presentation part 114 sorts the selected content information and tag information in the descending order in terms of the calculated score and presents the sorted result to the user (S604). Specifically, the episode presentation part 114 displays the episode information included in the selected content information in the form of a list. Specifically, on an episode presentation window as illustrated in FIG. 15, "case name", "event" and "countermeasure" in the episode information are displayed for each episode. Further, a "detail" button is displayed corresponding to each of the listed episodes. Once the "detail" button is pressed, the user log information, equipment log information and registered tag information corresponding to the episode are presented to the user. Further, on the episode presentation window, there is displayed a "network display" button for the user to request network display.

Then, the episode presentation part 114 determines whether or not the network display has been requested (S605).

When it is determined that the network display has been requested (YES in S605), the registered tag presentation part 112 executes network display processing of displaying the relevance between the registered tags included in the selected tag information (S606) and ends the episode presentation processing. Details of the network display processing will be described later.

When, on the other hand, it is determined that the network display has not been requested (NO in S605), the episode presentation part 114 ends the episode presentation processing.

(Network Display Processing)

Figure 16:
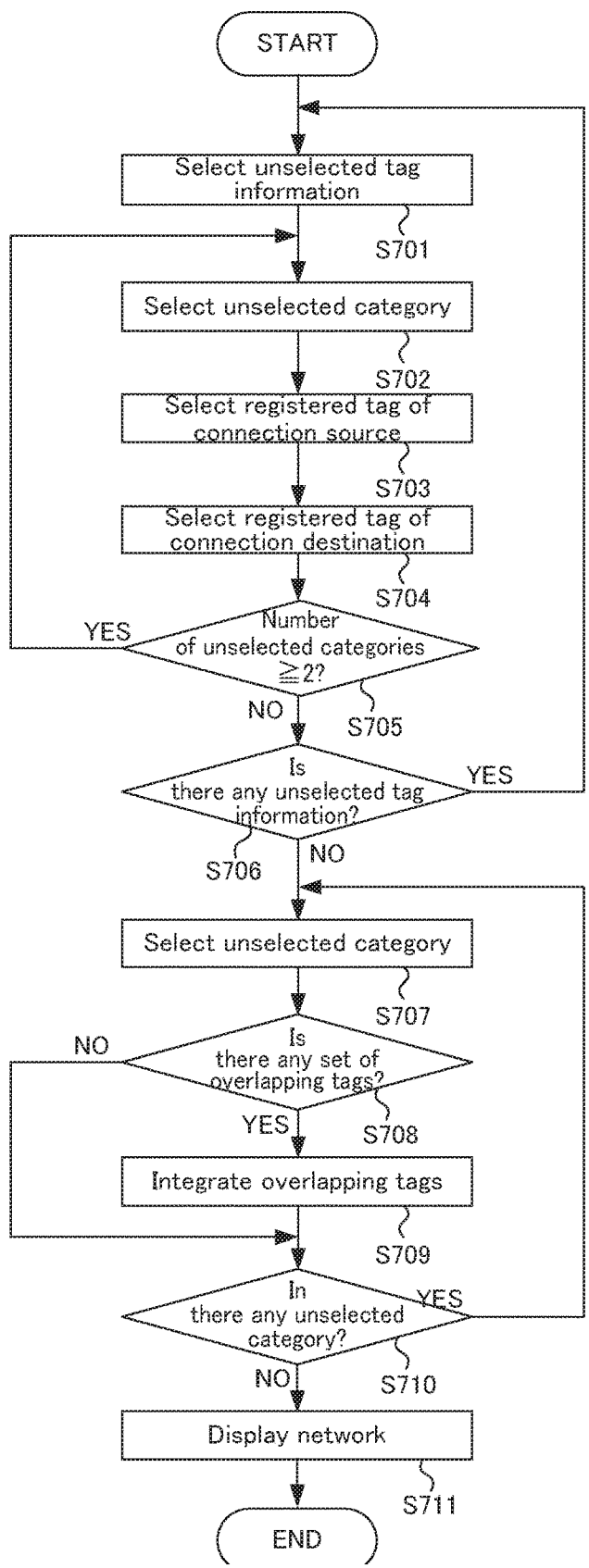
FIG. 16 is a flowchart illustrating the operation of network display processing.
Figure 17:
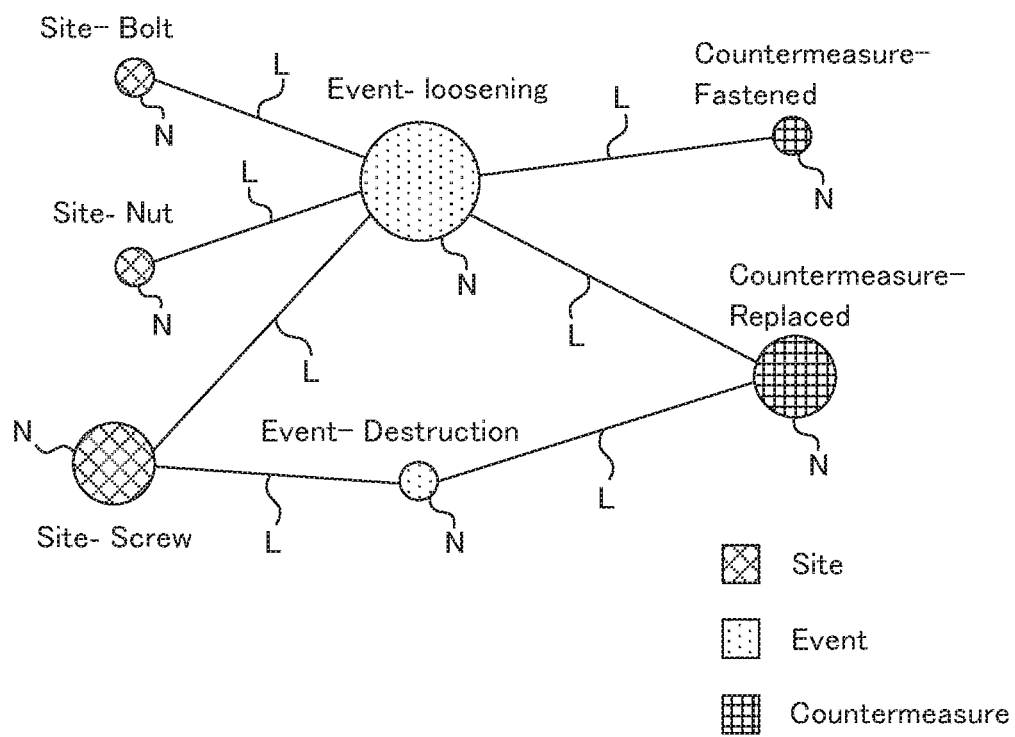
FIG. 17 is a view illustrating a network display window.

The network display processing will be described. FIG. 16 is a flowchart illustrating the operation of the network display processing. FIG. 17 is a view illustrating a network display window. In the network display processing, the registered tags are connected in the order of a predetermined category (Key value) and displayed, and, in the operation of FIG. 16, the order of the categories is assumed to be predetermined. Further, the tag information used in the network display processing is the tag information selected in step S602 of the above episode presentation processing.

As illustrated in FIG. 16, the registered tag presentation part 112 selects unselected tag information (S701) and sequentially selects, from among the categories for which the order has been predetermined, unselected categories in the determined category order (S702). Then, the registered tag presentation part 112 selects, as a connection source, the registered tag whose Key value is the category being selected (S703), selects, as a connection destination, the registered tag of the category next to the category being selected in the category order (S704), and connects the two registered tags.

After connection of the registered tags, the registered tag presentation part 112 determines whether or not there are two or more unselected categories in the categories for which the order is determined (S705).

When it is determined that the number of the unselected categories is less than two (NO in S705), the registered tag presentation part 112 determines whether or not there is any unselected tag information (S706).

When it is determined that there is no unselected tag information (NO in S706), the registered tag presentation part 112 performs category selection for integration of the tag information (S707). Specifically, the registered tag presentation part 112 selects, from among the categories for which the order is determined, an unselected category in selection for integration.

After the category selection, the registered tag presentation part 112 determines whether or not there is any set of overlapping registered tags, i.e., any set of registered tags having the same Value in the category being selected (S708).

When it is determined that there is any set of overlapping tags (YES in S708), the registered tag presentation part 112 integrates the overlapping tags (S709). Specifically, the registered tag presentation part 112 makes the overlapping tags into one registered tag while maintaining connection between them and counts the number of overlaps of the registered tags.

After the registered tag integration, the registered tag presentation part 112 determines whether or not there is any unselected category in the selection for integration (S710).

When it is determined that there is no unselected category (NO in S710), the registered tag presentation part 112 displays a network of the registered tag (S711) and ends the network display processing.

When, on the other hand, it is determined that there is an unselected category (YES in S710), the registered tag presentation part 112 selects once again the unselected category (S707).

When it is determined in step S708 that there is no set of overlapping registered tags (S708), the registered tag presentation part 112 determines whether or not any unselected category exists (S710).

When it is determined in step S706 that there is unselected tag information (YES in S706), the registered tag presentation part 112 selects once again the unselected tag information (S701).

When it is determined in step S705 that there are two or more unselected categories (YES in S705), the registered tag presentation part 112 selects the unselected category (S702).

The network of the registered tag thus generated includes, as illustrated in FIG. 17, a node N representing each registered tag and a link L connecting two nodes belonging to two adjacent categories in the predetermined category order. In the network, the connection relationship between the registered tags is represented by the link L with the overlapping registered tags in the same category integrated. The number of overlaps of each registered tag is represented by the size of a circle indicating the node N (bubble chart). According to the network display of the registered tag, the user can intuitively grasp, as the registered tag important in searching for the episode, the registered tag connected to a large number of the registered tags. Further, by changing the display of the node N depending on the category to which the registered tag indicated by the node N belongs, the user can easily grasp to which category the focused node N belongs. In FIG. 17, the order of the categories to be displayed as the network is set as "site"→"event"→"countermeasure". Further, although the color of the node N differs depending on the category in FIG. 17, the shape of the graphic indicating the node N may be made to differ depending on the category.

In the present embodiment, it has been described that the episode management program is installed ahead of time inside the above-described episode management device; however, the episode management program in the present invention may be stored in a storage medium. The storage medium mentioned here refers to all media that can be read or executed by a computer as the above-described episode management device, including: a medium detachably attached to the episode management device, such as a magnetic tape, a magnetic disk (hard disk drive, etc.), an optical disk (CD-ROM, DVD disk, etc.), a magneto-optical disk (MO, etc.), or a flash memory; and a medium that can be transmitted over a network.

While the embodiment of the present invention has been described above, the embodiment is merely illustrative and does not limit the scope of the present invention. This novel embodiment can be practiced in other various forms, and various omissions, substitutions and changes may be made without departing from the scope of the invention. The embodiment and modification thereof are included in the scope or spirit of the present invention and in the appended claims and their equivalents.

REFERENCE SIGNS LIST

10: Episode management device
103: Episode acquisition part
107: Episode management part
108: Registered tag extraction part
109: Registered tag management part
110: Condition acquisition part
111: Search tag extraction part
112: Registered tag presentation part
114: Episode presentation part

The invention claimed is:

1. An episode management device that manages an episode in such a manner that the episode can be shared, comprising:
 an episode acquisition part that acquires an episode input, the form of text, by a registering user who registers the episode;
 an episode management part that manages the acquired episode;
 a registered tag extraction part that extracts a registered tag which is meta information of the episode based on the acquired episode;
 a registered tag management part that manages the extracted tag as tag information associated with the managed episode;
 a condition acquisition part that acquires, as condition information, a condition input by a searching user who searches for the episode;
 a search tag extraction part that extracts a search tag from the condition information;
 a registered tag presentation part that user-selectably presents, to the searching user, the registered tag having high similarity to the search tag, among the tag information managed by the registered tag management part; and
 an episode presentation part that presents, to the searching user, the episode having high similarity to the registered tag selected by the searching user, among the episodes managed by the episode management part.

2. The episode management device according to claim 1, wherein the registered tag extraction part extracts the registered tag by text mining based on the acquired episode.

3. The episode management device according to claim 1, wherein the registered tag and search tag are expressed in the same format.

4. The episode management device according to claim 1, wherein the registered tag presentation part user-selectably presents, to the searching user, among the tag information managed by the registered tag management part, the registered tag in the tag information including a relatively large number of the registered tags matching the search tag.

5. The episode management device according to claim 1, wherein the episode presentation part presents, to the searching user, among the episodes managed by the episode management part, the episode associated with the tag information including a relatively large number of the registered tags selected by the searching user.

6. The episode management device claim 2, wherein
the registered tag extraction part extracts a relevance tag which is meta information indicating relevance between two registered tags by text mining based on the acquired episode,
the registered tag management part manages the relevance tag in association with the tag information, and
the episode management device further includes a relevance tag presentation part that user-selectably presents, to the searching user, the registered tags the relevance between which is indicated by each relevance tag included in the tag information including a relatively large number of the registered tags matching the registered tag selected by the searching user.

7. The episode management device according to claim 1, wherein
the episode management device is connected to an equipment log management device that manages, for at least one equipment, a measurement value obtained by using a sensor for measuring a change caused due to an operation of the equipment or an error code output from the equipment as an equipment log in association with the equipment and in chronological order,
the episode acquisition part acquires equipment information indicating an equipment relating to the episode input by the registering user and time information indicating a time range relating to the episode,
the episode management device further includes an equipment log acquisition part that acquires the equipment log from the equipment log management device based on the acquired equipment information and time information, and
the episode management part manages the acquired episode and acquired equipment log in association with each other.

8. The episode management device according to claim 7, wherein when the error code is included in the acquired equipment log, the registered tag extraction part extracts the error code as the registered tag.

9. The episode management device according to claim 1, wherein each user has a measurement device for measuring action of the user,
the episode management device is connected to a user log management device that manages, for at least one measurement device, a measurement value obtained by using the measurement device as a user log in association with the measurement device and in chronological order,
the episode management device further includes a user management part that manages user information uniquely indicating a predetermined user and measurement device information uniquely indicating the measurement device that the user has, in association with each other,
the episode acquisition part acquires the user information of the registering user who inputs the episode and the time information indicating a time range relating to the episode,
the episode management device further includes a user log acquisition part that acquires the user log from the user log management device based on the measurement device information associated with the acquired user information by the user management part and the acquired time information, and
the episode management part manages the acquired episode and the acquired user log in association with each other.

10. The episode management device according to claim 1, wherein the registered tag extraction part extracts the registered tags in such a manner as to classify the registered tags into predetermined categories,
the registered tag management part manages the registered tag in such a manner as to add, to the registered tag, the category to which the registered tag belongs, and
the registered tag presentation part presents, to the user, network display in which the registered tags included in each of the managed tag information are connected according to a predetermined category order, the registered tags in different tag information in the same category that overlap each other are integrated, and the number of overlaps is visualized.

11. An episode management program that manages an episode such that the episode can be shared, allowing a computer to function as:
an episode acquisition part that acquires the episode input, in the form of text, by a registering user who registers the episode;
an episode management part that manages the acquired episode;
a registered tag extraction part that extracts a registered tag which is meta information of the episode based on the acquired episode;
a registered tag management part that manages the extracted tag as tag information associated with the managed episode;
a condition acquisition part that acquires, as condition information, a condition input by a searching user who searches for the episode;
a search tag extraction part that extracts a search tag from the condition information;
a registered tag presentation part that user-selectably presents, to the searching user, the registered tag having high similarity to the search tag, among the tag information managed by the registered tag management part; and
an episode presentation part that presents, to the searching user, among the episodes managed by the episode management part, the episode having high similarity to the registered tag selected by the searching user.

12. An episode management method that manages an episode such that the episode can be shared, allowing a computer to:
    acquire the episode input, in the form of text, by a registering user who registers the episode;
    manage the acquired episode;
    extract a registered tag which is meta information of the episode based on the acquired episode;
    manage the extracted tag as tag information associated with the managed episode;
    acquire, as condition information, a condition input by a searching user who searches for the episode;
    extract a search tag from the condition information;
    user-selectably present, to the searching user, among the managed tag information, the registered tag having high similarity to the search tag; and
    present, to the searching user, among the managed episodes, the episode having high similarity to the registered tag selected by the searching user.

* * * * *